United States Patent [19]

Matt et al.

[11] Patent Number: 5,134,618
[45] Date of Patent: Jul. 28, 1992

[54] METHOD OF TESTING CONNECTING AND/OR SWITCHING DEVICES AND/OR LINES

[75] Inventors: Hans J. Matt, Remseck, Fed. Rep. of Germany; Mark G. Karpovsky, Newton; Lev B. Levitin, Brookline, both of Mass.

[73] Assignee: Alcatel N.V., Netherlands

[21] Appl. No.: 455,257

[22] Filed: Dec. 22, 1989

[30] Foreign Application Priority Data

Dec. 23, 1988 [DE] Fed. Rep. of Germany ....... 3843564

[51] Int. Cl.$^5$ ............................................. G06F 11/08
[52] U.S. Cl. ................................ 371/37.1; 371/37.6
[58] Field of Search .................... 371/37.6, 37.1, 49.1, 371/49.2, 49.3, 50.1, 51.1, 21.5, 37.4

[56] References Cited

U.S. PATENT DOCUMENTS

| | | | |
|---|---|---|---|
| 3,452,328 | 6/1969 | Hsiao | 371/37.6 |
| 3,784,976 | 1/1974 | Ho | 371/49.3 |
| 4,456,980 | 6/1984 | Yamada | 371/50.1 X |
| 4,593,393 | 6/1986 | Mead | 371/37.6 |
| 4,596,015 | 6/1986 | Clements et al. | 371/51 |
| 4,710,935 | 12/1987 | Kim | 371/49.2 |
| 4,768,193 | 8/1988 | Takemae | 371/50.1 X |

FOREIGN PATENT DOCUMENTS 0217555  4/1987  United Kingdom .

*Primary Examiner*—Robert W. Beausoliel
*Attorney, Agent, or Firm*—Ware, Fressola, Van Der Sluys & Adolphson

[57] ABSTRACT

A method of testing connecting and/or switching devices, particularly of a space-division multiplex switching matrix (K), in which one or more of a plurality of input lines ($D_i$, $C_j$) is connectable with one or more of a plurality of output lines ($Y_k$), and which is carried out to check the formation of a check word is described. A first check word PB1 is derived from the signals on the input lines ($D_i$, $C_j$), and also, according to the same rules of formation, a second check word PB2 is derived from the signals on the output lines ($Y_k$), both derived continuously. The two check words are compared to each other. In case of a disagreement, an error indication is provided.

18 Claims, 3 Drawing Sheets

METHOD OF TESTING CONNECTING AND/OR SWITCHING DEVICES AND/OR LINES

BACKGROUND OF THE INVENTION

1. Field o the Invention

The invention relates to a method of testing connections between fist and second groups of lines.

2. Description of the Prior Art

It is known to use, generate and transmit parity and check bits or, in general, check words for error detection and error correction and to draw conclusions from their syndrome, e.g., at the end of a transmission channel, as to whether the signals were transmitted in an error-free manner.

This also applies analogously for the transmission of electric signals by means of switching system and networks, such as e.g., by means of an optical section or by means of a spacd-division multiplex switching matrix. In order to determine a check word from a specific number of consecutive bits that form a signal and, if applicable, to draw conclusions concerning the presence of errors in the transmission channel by evaluation of the received bits, there is a variety of methods that are known as the theory of error detection and correction.

In corrections methods of this type, a certain time is always required until a number of bits forming the unit to be checked has been transmitted. Only when all of these bits have been received is it possible to determine the syndrome from them and to draw conclusions therefrom. If several channels are involved in a transmission system, it may be necessary to use a method of this type for each of these channels. This requires a relatively high switching effort. In addition, these methods cannot be used if the signals on a line are not always traveling in the same direction, for example, in the case of bus lines.

SUMMARY OF THE INVENTION

It is the task of the present invention to develop a method of the above-mentioned type further in such a way that the switching effort is reduced and the capacity of the test procedure is improved, in the sense that, at all times, not only the information to be transmitted but also the complete operability of a system is checked. The method is particularly suitable for a space-division multiplex switching matrix.

This task is carried out according to the invention by means of testing connections between a first group of lines and a second group of lines by means of check words, wherein a first check word is continuously derived for the signals on the lines of the first group on a parallel basis, that, according to the same rules, a second check word is derived from the signals on the lines of the second group on a parallel a basis, that the two check words are compared and that if the check words disagree, an error indication is provided. An arrangement for carrying out the above method includes a parity generator which has the lines of the first group connected to its inputs and derives the first check word therefrom, by a parity checker which has the lines of the second group connected to tits inputs and derives the second check word therefrom, and by a logic element for comparing the check words.

According to the invention, a check word, i.e., in the simplest case, a parity bit is not derived from characters transmitted or received consecutively in time on one channel, but, instead, the check word is formed at each time from the plurality of signals present precisely at that time on a plurality of channels or lines, and at the points of the system (for example, input and output) to be compared to each other. The transmitted check word is compared to the check word formed at the output of the system (syndrome check). If the two check words disagree, i.e., if the syndrome is odd, then an error is present. Whereas, in the known methods, the check words are, in each case, formed serially with respect to time and individually with respect to channel, in the invention they are formed on a parallel basis with respect to time and a comprehensive basis with respect to system, i.e., not individually with respect to channel.

The check word at the input is, of course,—if correctly transmitted—identical to the check word at the output only if every input signal is also present again as an output signal, e.g., in a space-division multiplex switching matrix, if the association of each input to each corresponding output is 1:1. If the association of an input with a corresponding output is not 1:1, that is, if, for example, an input is connected to several outputs (e.g., if a television program is received by several subscribers) then this is taken into consideration, according to the invention, by means of an auxiliary check word.

By means of the method according to the invention it is possible not only to check the lines and connections of a spacd-division multiplex switching matrix but also, quite generally, to check all systems, insofar as it is possible to associate, with every check word derived from a first set of signals at a given time, a check word derived from a second set of signals, so that a comparison of the check words—possibly with a consideration of system-related corrections—makes it possible to determine that all channels and switching devices are operating perfectly. Under these assumptions, the method according to the invention can also be used simultaneously on various hierarchical levels of a system. The error detection can be combined with an error correction in a, known manner.

DESCRIPTION OF THE DRAWINGS

Exemplifying embodiments of the invention and its advantageous further developments are described below with reference to the attached drawings, in which:

FIG. 1 shows the known structure of a space-division multiplex switching matrix K, with (n+m) input lines and m output lines as a [(n+m)×m] switching matrix. The (n+m) input lines are divided into n input lines $D_1$, $D_2$... $D_n$ and m input lines $C_1$, $C_2$... $C_m$ (expansion inputs). The m output lines $Y_1$, $Y_2$... $Y_m$ are also provided. Preferably, n=m =16. At every point of intersection of an input line $D_i$ with an output line $Y_k$, there is located a switching cell S With control inputs a and b according to FIG. 2. All control inputs a of a line are connected with the control line of an output decoder OD associated with this line. All control inputs b of a column are with the associated control line of an input decoder ED. In the expansion input lines C, the diagonal association shown is present. The control of the output decoder OD and of the input decoder ED is carried out in a known manner and is indicated by a bus CTR. The enabling of the output decoder OD is carried out by means of a line E. A clocking circuit Cl is connected into the output lines $Y_k$.

Figure 1:
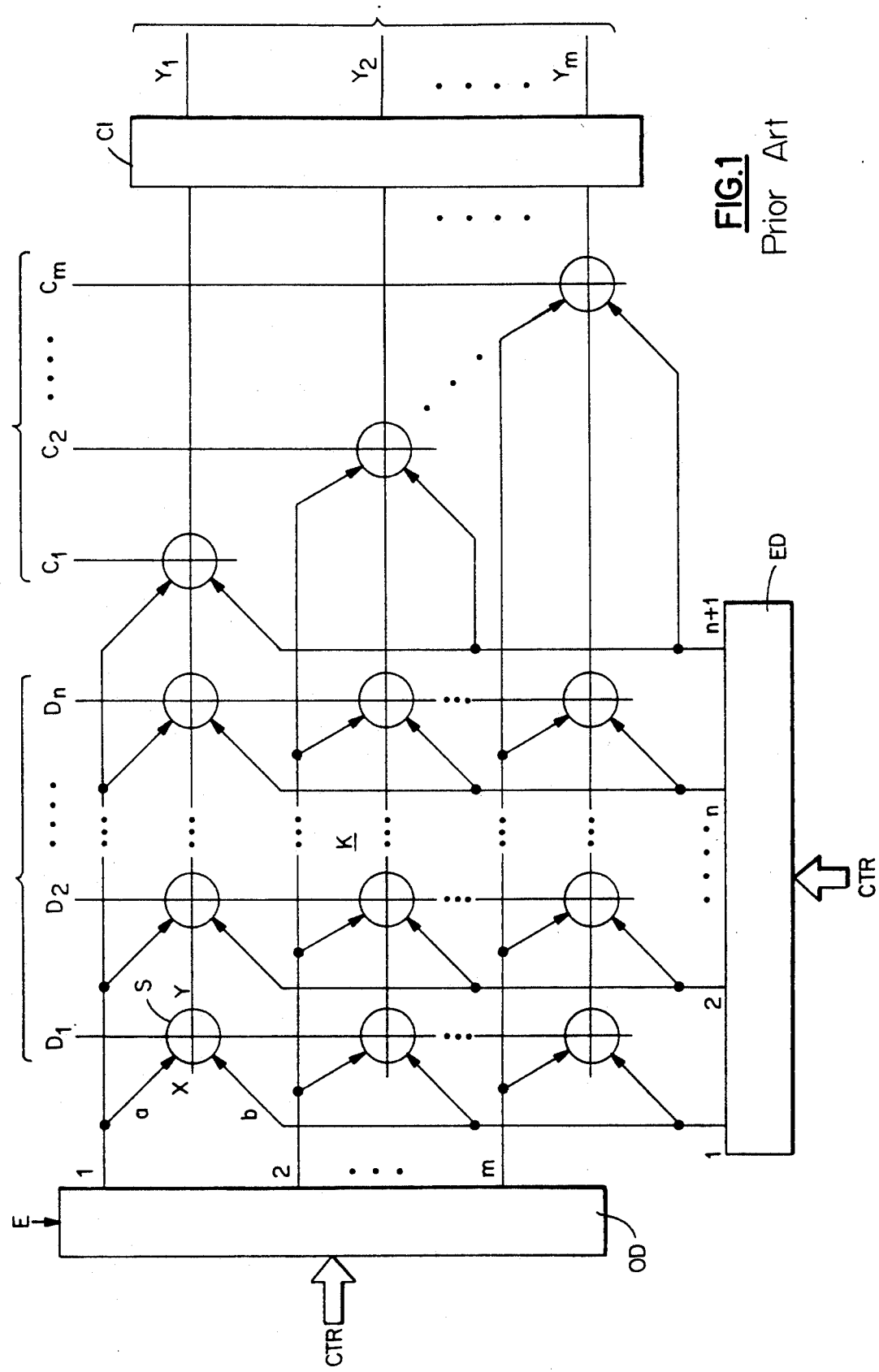
FIG. 1 shows a space-division multiplex switching matrix K according to the state of the art.
Figure 2:
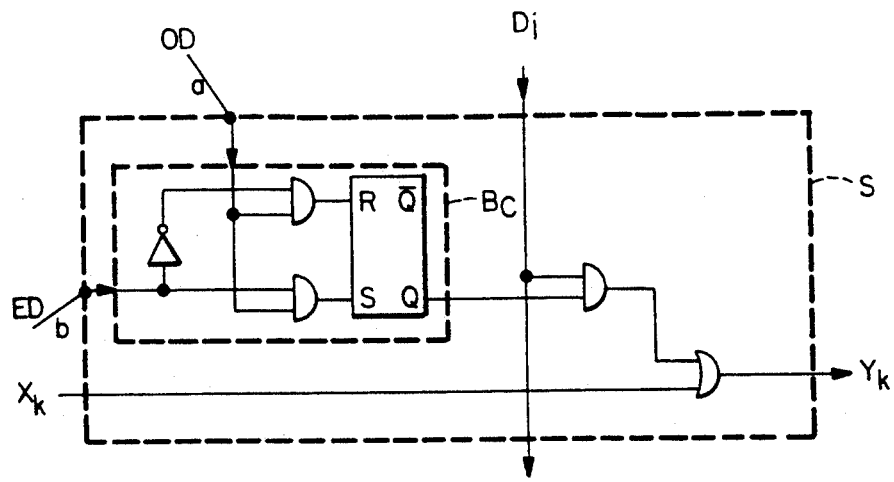
FIG. 2 shows the structure of a switching cell S of FIG. 1.

If the inputs a and b of a switching cell S (FIG. 2) are in the 1 state, i.e., if $a=b=1$, then $Y_k=D_i \vee x_k$, i.e., an output signal 1 appears on the output line $Y_k$, if a 1 is present either on the associated input line $D_i$ or on the input line $x_k$ coming from the switching cell located ahead of it in the line. This follows from the construction of the switching cell S with use of conventional gates and of a bi-stable flip-flop according to FIG. 2. The switching state of the switching cell S is determined by the state of the output Q of the flip-flop. It forms a binary memory BC with the AND gates connected in series and an inverter. Q becomes 1 when $a=b=1$. If $a=1$ and $b=0$, then Q changes to 0. If $a=0$, then Q remains unchanged. Normally, the output decoder supplies 1 on one line and 0 on all other lines, as soon as it has been enabled by means of E. Otherwise, all lines a are equal to 0. This results in the fact that exactly one input line $D_i$ or $C_j$ is switched to each output line $Y_k$.

Figure 3:
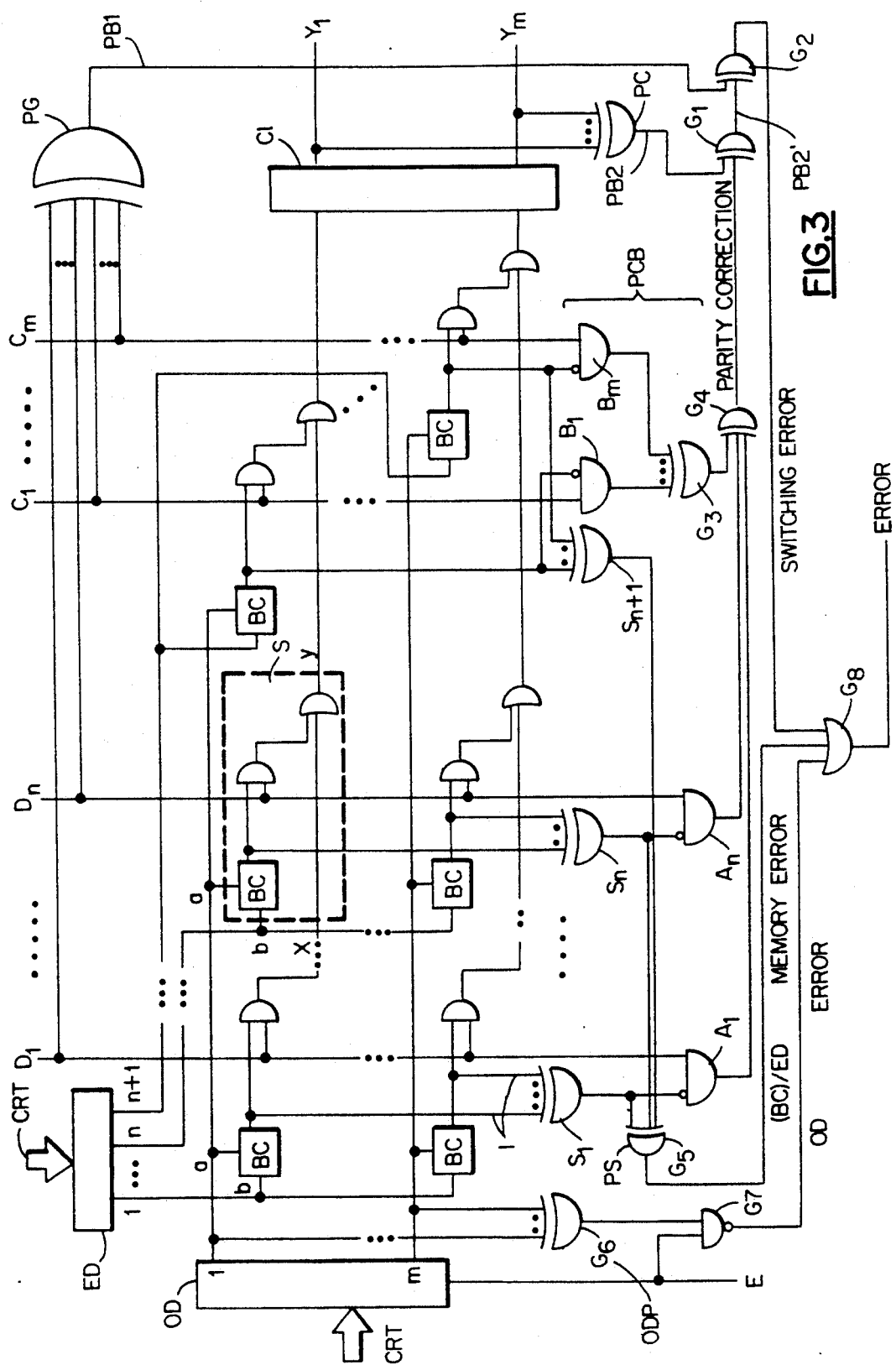
FIG. 3 shows, as an exemplifying embodiment, a space-division multiplex switching matrix similar to that in FIG. 1, with the inclusion of the invention.

A space-division multiplex switching matrix, with the inclusion of checkers according to an exemplifying embodiment of the invention, is shown in detail in FIG. 3.

The data coming in on the input lines $D_1, D_2 \ldots D_n$ and the expansion input lines $C_1, C_2 \ldots C_m$ are applied—in parallel to their application of the individual switching cells S—to a parity generator PG, which derives a check word PB1 (in the example 1 check bit) therefrom. The derivation is carried out according to general rules, i.e., approximately as shown in FIG. 3, such that a check bit is "1" if the number of input lines carrying the signal 1 is odd and is "0" if the number of input lines carrying 1 is even. Other associations are, of course, possible. The check bit PBI is applied to an input of the XOR gate $G_2$.

The output lines $Y_1, \ldots, Y_n$ are applied to the parity checker PC. In general, a check word, in this case, a check bit PB2 according to FIG. 3, is derived in it and —this is essential—this is done according to the same rules by which the check bit PB1 has been derived in the parity generator PG, i.e., it is 1 if an odd number of input lines is carrying the 1, and it is 0 if an even number of input lines is carrying the 1. Under the assumption that every input line $D_i$, $C_j$ is connected with exactly one output line $Y_k$, the check words or check or parity bits PB1 and PB2 are identical ($n+m>m$).

The check bit PB2 is applied to the first input of the XOR gate $G_1$. If PB2 is equal to 1, then the output $G_1$ also becomes 1, unless 1 is also applied to the other input of $G_1$ (for correction purposes). If PBI and PB2 are both equal to 1, the result is that this involves an exclusive OR gate, a signal 0 at the output of $G_2$ and therefore no ERROR alarm at the output of the OR gate $G_8$. In that case, the check was positive, i.e., it had shown that there is no error between the input and output, and therefore that the signals have been transmitted from the input to the output of the system in an error-free manner.

The fact that, on the basis of the control by means of the decoders OD and ED an input line $D_{i, Cj}$ carrying the signal 1 can be connected not only with one output line but with several output lines $Y_k$, or with zero output lines, is taken into consideration in a parity correction block PCB, because this would result in the fact that the check bit PB1 is not identical with the check bit PB2. In the exemplifying embodiment according to FIG. 3, the parity correction block is made up of the XOR gates $S_1 \ldots S_{n+1}$, the AND gates $B_1 \ldots B_m$, $A_1 \ldots A_n$, and the XOR gates $G_3$, $G_4$ which forms an auxiliary check bit as a special case of an auxiliary check word. The outputs of all memories BC associated with an input line $D_1$ are, in each case, connected with an input of Si by means of lines 1. The outputs of $S_1 \ldots S_m$ are applied to the inverted inputs of AND gates $A_1 \ldots A_n$, their outputs are, in turn, connected to the inputs of $G_4$. The input lines $D_1 \ldots D_n$ are also directly connected with the other inputs of $A_1 \ldots A_n$ in each case. The outputs of the memories BC in the columns associated with $C_1 \ldots C_m$ are applied to the inputs of the one XOR gate $S_{n+1}$, and also to inverted inputs of AND gates $B_1 \ldots B_m C_1, \ldots, C_m$ themselves are applied in each case to the other, uninverted inputs of $B_1, \ldots, B_m$, whose outputs are all applied to the XOR gate $G_3$. The output of $G_3$ is again applied to an input of $G_4$.

The operation is as follows: The parity bit PB1 at the output of PG does not change when an input signal is applied repeatedly to the outputs $Y_n$. If a given input line $D_i$ ($i=1, \ldots, n$) is connected to an even number of output lines $Y_k$, and if the signal at $D_i$ is equal to 1, then the parity bit PB2 at the output of the parity generator PC changes. Otherwise, i.e., if $D_i$ is connected with an odd number of output lines $Y_k$, it does not change. To compensate for this change, the parity of all binary memory cells BC that are connected with the input line $D_i$ is derived by means of the XOR gates $S_i$, inverted, and applied to the AND gate $A_i$ together with the signal from $D_i$. In this manner, n auxiliary check bits are derived at the outputs $A_i$ ($i=1, \ldots, n$).

The parity and check bit PB2 also changes if a line $C_j$ ($=1, \ldots m$) is not connected with the corresponding output line $Y_k$ and the signal at $C_j$ is equal to "1". Otherwise, there is no change in the parity at the output. The auxiliary check bit for the input lines $C_1 \ldots C_m$ is derived from the AND gates $B_1, \ldots, B_m$ and from the XOR link $G_3$. The auxiliary check bit for parity correction for the whole circuit is obtained by applying the outputs of the gates $A_i$ and of the gate $G_3$ to the XOR gate $G_4$.

If, for example, two binary memory cells BC are connected for an input $D_i$, i.e, if they have the signal 1 at the output Q, then an output of 0 is obtained at the output of the associated XOR gate $S_i$ and, after inversion, a signal 1 is obtained at the input of the AND gate $A_i$ connected in series. If the other input of the same AND gate $A_i$ also has 1 at the input, because the input line $D_i$ is carrying the signal 1, then the output of the AND gate $A_i$ is equal to 1. The result of this is that a 1 is also present at the input of the XOR gate $G_4$ that is connected in series.

An XOR gate $S_{n+1}$ is sufficient for the data inputs $C_i$. The others can be omitted, because only one switching cell S and accordingly, only one binary memory cell BC is provided per column.

If, for example, an input line $D_i$ or $C_j$ carrying a signal 1 is switched to two inputs $Y_k$, then this initially leads to a parity bit PB1 equal to 1, while, at the same time, the parity bit PB2 is equal to 0. Since, however, a signal 1 is now applied to $G_4$ via $S_i$ and $A_i$, the output $G_1$ is corrected appropriately. The output of $G_2$ is therefore the same as in the case of an identity of PB1 and PB2.

In order to also detect errors in the status memories BG of the space-division multiplex switching matrix, a parity and check bit for all $[(n+1) \cdot m)]$ memory cells BC is derived in a memory parity checker PS. In FIG. 3, this consists of an XOR gate $G_5$. In the case of an odd m an inverter must also be connected in series with the gate GS.

Errors at the control outputs of the output detector OD if, for example, more than one control output is equal to 1, can also be detected by means of an output parity checker ODP, which consists in FIG. 3 of the XOR gate $G_6$ and the NAND gate $G_7$.

In the exemplifying embodiment, therefore, parity checks are carried out both at the input and the output, possibly with the inclusion of certain corrections, which must produce agreement in the case of a perfect operation of the switching matrix being checked or, expressed in a more general manner, of the circuitry being checked. This is determined in a comparison (syndrome computation). The additional errors can be detected with circuits using the natural, i.e., existing circuit redundancy to detect defective states.

The monitoring described can be carried out during continuous operation (on line). It detects both permanent and intermittent errors. The automatic error detection is particularly important for the detection of intermittent errors, which remain undetected in the case of off-line testing. The degree of defectiveness of the system unit can be detected from the frequency of the errors that appear.

In a generalized manner, the testing is carried out both at the input and the output by means of known test codes (compare J. MacWilliams and N. J. A. Sloane, Error Correcting Codes, North Holland, 1978), applied to a single check bit in the exemplifying embodiment. This check provides an overall parity of the $(n+m)$ input signals in the parity generator PG. The corresponding parity bit at the output is derived from the parity checker PC. Both devices are based on linear block codes, which can be made up of XOR gates. The check or parity bits derived by the units PG and PC can be different, because it is permissible for some of the input lines to be connected to zero output lines or to several output lines. This is corrected on the basis of the content of the binary memory cells BC determining the switching cells S. The parity correction bit is generated by the parity correction block PCB and is added in the XOR gate $G_1$ to the signal at the output of the parity checker PC. The result PB2' is compared to PB1 in $G_2$. If the output of $G_2$ is equal to 1, this indicates an error.

A total of $[mn+5m+3n+1]$ gate circuits, each provided with two inputs, are required as additional switching elements. This switching effort is only a fraction of the complexity of the total switching devices.

This built-in structural redundancy makes it possible to detect the following errors, both permanent and intermittent:

A. In the switching region (broadband):
1. All individual errors (generally: all errors of odd multiplicity) in the switching cells and in the clocking circuits;
2. All individual (odd) errors in the parity generator PG, in the parity checker PC, and in the gates $G_1$ and $G_2$;
3. All individual (odd) errors in the parity correction block PCB.

B. In the control region (narrowband):
4. All individual (odd) errors in the memory and at the outputs of the input detector, such as, for example, a failure of the decoding or a double (even) decoding. Failure of a decoding means that all outputs of the decoder are equal to 0, while the enabling signal on the line E is equal to 1; double decoding (even) means that two (or an even number) of the outputs are equal to 1;
5. All single (odd) errors at the outputs of the output detector and in the output parity check;
6. All single (odd) errors of the memory parity check;
7. All multiple errors (particularly double errors) that are combinations of two errors of the following types: 1 and 4; 1 and 5; 1 and 6; 2 and 4; 2 and 5; 2 and 6; 3 and 5, 3 and 6; 4 and 5; 4 and 6.

All permanent errors appearing as errors of the above-indicated types for specific data and control commands are also detected.

The check according to the invention is an on-line test, which takes place continuously under the operating conditions of the total system and does not require any additional test equipment or switching processes in any test state.

Figure 4:
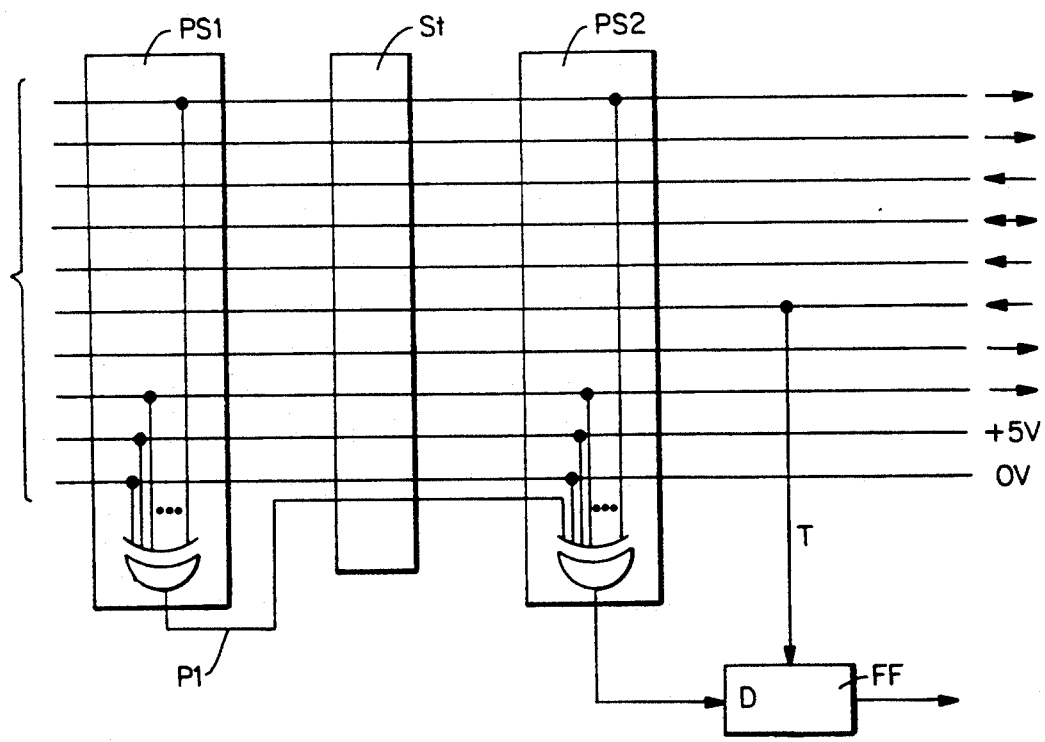
FIG. 4 shows, as an exemplifying embodiment, a connection to a bus line with monitoring according to the invention. DESCRIPTION OF THE PREFERRED EMBODIMENT

In the check according to the invention, the direction in which the signals travel in the lines investigated, and whether they always travel in the same direction, are also irrelevant. This invention can therefore also be used according to FIG. 4, for example, in order to detect in the case of a connection to a bus consisting of many lines whether the same signals are present on the bus and in the circuit connected to this. In this way, the contacts in between (St) are ultimately checked.

The major part of all errors appearing only temporarily is caused by errors at contacts (plug connections, soldered points, bonding sites). The permanent errors are, as a rule, simple to detect anyway.

The monitoring is then carried out, for example, in such a manner that, on the one hand, in a first check circuit PSI a check word, preferably a single check bit P1, is formed over all of the bus lines, and that, on the other hand, on the side of the connected circuit, a check word is formed in the same manner in a second check circuit PS2 over the corresponding lines and is compared to the other check word. For this purpose, at least one of the two check words (in this case, P1) must be transmitted to the other side. In this case, the nature of the signals on the individual lines is then completely irrelevant. Even lines with supply voltages can be included. In that case, the check circuits can also use the applied supply voltages for their own supply, e.g., by means of a diode network. The important point is only that the formation of the check words, the comparison of these, or the output of an error signal may occur only at those times at which defined signal states are present on all lines. For this purpose, the result of the comparison is outputted by the second check circuit PS2 by means of a clock pulse T and a flip-flop FF.

If delays occur between the monitored points, as is the case for the example of the switching matrix, then these must, however, be identical to each other. The delays of the check words must also be adjusted to each other. In such cases, however, all signals must also run in the same direction.

The invention is also applicable to circuit arrangements with a hierarchical structure. This is very frequently the case.

A plurality of integrated circuits is, as a rule, grouped on a printed circuit board to form an assembly, several printed circuit boards are grouped by means of a backside printed circuit board (back panel) to a larger unit, and several units are grouped into a system.

In each integrated circuit, a check bit can be formed via all its connecting lines and can be outputted onto the printed circuit boards. A check bit can, in turn, be formed on the printed circuit board via all of the lines leading away from the printed circuit board. The check circuits required for this purpose can be integrated in the plugs and the jacks. In a comparison of the check bits to each other, it must then be taken into consideration that the signals on the individual lines enter into a larger or smaller number of the check bits formed overall. This is comparable to the formation of the parity connection in the circuit according to FIG. 3.

This can be continued in the higher hierarchical levels.

Many of the known error correction methods can be used to correct an error detected in the manner according to the invention.

What is claimed is:

1. A method for testing a spec-division multiplex switching matrix (K) in which one or more of a plurality of input lines ($D_i$, $C_j$) are connectable with one or more of a plurality of output lines ($Y_j$), said testing being performed by means of check words, said method comprising the steps of:
   continuously deriving from signals on the input lines ($D_i$, $C_j$) a first check word (PB1) on a parallel basis in accordance with a set of rules;
   continuously deriving from signals on the output lines ($Y_j$) a second check word (PB2) on a parallel basis in accordance with the set of rules;
   comparing the two check words; and
   providing an error indication when the two check words disagree.

2. A method as claimed in claim 1, characterized in that the derivation of the first check word (PB1) from the signals on the lines ($D_i$, $C_j$) for the first group takes place in a parity generator (PG) having al input lines connected to its inputs in parallel, that the derivation of the second check word (PB2) takes place in a parity checker (PC) having al lines ($Y_i$) of the second group connected to its inputs in parallel, and that the comparison between the check words takes place in a logic element ($G_2$) whose output actuates the error indication.

3. A method as claimed in claim 1, characterized in that in comparing the check words (PB1, PB2), an auxiliary check word derived in a parity correction device (PCB) compensates for a check word (PB2) if one check word (PB2) differs from the other check word because one of the lines ($D_i$, $C_j$) of the first group is connected either to none of the output lines ($Y_j$) or to two or more output lines ($Y_j$).

4. A method as claimed in claim 3, characterized in that a switching network (K) is tested which has switching cells (S) arranged in columns and rows in matrix-like fashion and each being controlled by a state of one memory cell (BC), a check word is formed in a first unit ($S_i$) of the parity correction device (PCB) by evaluating states (Q) of the memory cells (BC), of a column that on an occurrence of a signal at an input line ($D_i$, $C_j$) associated with the column, the check words determined for the columns are evaluated together ($A_i$) in a second unit ($G_4$), to form an additional check word, and that said additional check word is used for parity correction in the comparison between the check words (PB1, PB2) derived from the signals on the input lines ($D_i$, $C_j$) and the output lines ($Y_i$).

5. A method as claimed in claim 4, characterized in that the check words derived for the memory cells (BC) per column of the switching network arranged in a matrix-like fashion are evaluated in a memory parity checker (P5, $G_5$) by formation of an additional check word, in such a way that an error indication is provided if more than only one input line ($D_i$, $C_j$) is provided with an output line ($Y_i$) as a result of an error in a memory (BC) or an error in its control (b) by means of an input decoder (ED).

6. A method as claimed in claim 4, characterized in that in the presence of an enable signal (E), an output parity checker (ODP; $G_6$, $G_7$) evaluates the control signals (a) controlling the memories (BC) for the switching cells (S) to form an additional check word.

7. A method as claimed in claim 1, characterized in that the matrix includes switching cells (S) include a binary memory unit (BC) which, when in one state, causes a signal on an associated input line ($D_i$, $C_j$) to be switched to an associated output line ($Y_i$), the change to this state taking place if a control signal (a) is applied to said binary memory unit (BC) from an input decoder (ED) associated with the input lines from an output decoder (OD) associated with the output lines.

8. A method as claimed in claim 1, characterized in that the first check word (PB1) consists of a number which indicates how many input lines are carrying a given signal simultaneously, and that the second check word (PB2) consists of a number which indicates how many output lines are carrying a given signal simultaneously.

9. A method as claimed in claim 8, characterized in that the first check word (PB1) is a parity bit which indicates whether an even or odd number of input lines ($D_i$, $C_j$) is carrying a given signal, and that the second check word (PB2) is a parity bit which indicates whether an even or odd number of of output lines ($Y_i$) is carrying a given signal.

10. A method as claimed in claim 9, characterized in that the devices (P, PG, PC, PCB, ODP, SP) for the derivation of check words are formed by means of exclusive-OR-gates.

11. A method of testing connection s between a first group of lines ($D_i$, $C_j$) and a second group of lines ($Y_j$) by means of check words, comprising the steps of:
   continuously deriving from signals on the lines ($D_i$, $C_j$) of the first group on a parallel basis a first check word (PB1) according a set of rules;
   deriving from signals on the lines ($Y_j$) of the second group of lines on a parallel basis a second check word (PB2) in accordance with the set of rules;
   deriving an auxiliary check word in a parity correction device (PCB) which compensates for a second check word (PB2) when the second check word (PB2) differs from the first check word (PB1) because one of the lines ($D_i$, $C_j$) of the first group is connected to other than a single line ($Y_j$) of the second group; and
   comparing the two check words and providing an error indication when the check words disagree.

12. A method as claimed in claim 11, characterized in that a switching network (K) is tested which has switching cells (S) arranged in columns and rows in matrix-like fashion and each controlled by a state of one memory cell (BC), a check word is formed in a first unit ($S_i$) of the parity correction device (PCB) by evaluating states (Q) of the memory cells (BC) of a column, that on the occurrence of a signal at an input line ($D_i$, $c_j$) associated with the column, the check words determined for the columns are evaluated together ($A_i$) in a second unit ($G_4$), to form an additional check word, that said additional check word is used for parity correction in the comparison between the check words (PB1, PB2) derived from the signals on the input lines ($D_i$, $C_j$) and the output lines ($Y_i$).

13. A method as claimed in claim 12, characterized in that the check words derived for the memory cells (BC) per column of the switching network arranged in a matrix-like fashion are evaluated in a memory parity checker (P5, $G_5$) by formation of an additional check word, in such a way that an error indication is provided if more than only one input line ($D_i$, $C_j$) is provided with an output line ($Y_i$) as a result of an error in a memory (BC) or an error in its control (b) by means of an input decoder (ED).

14. A method as claimed in claim 12, characterized in that in the presence of an enable signal (E), an output parity checker (ODP; $G_6$, $G_7$) evaluates the control signals (a) controlling the memories (BC) for the switching cells (S) to form an additional check word.

15. A method as claimed in claim 12, characterized in that the matrix includes switching cells (S) include a binary memory unit (BC) which, when in one state, causes a signal on an associated input line ($D_i$, $C_j$) to be switched to an associated output line ($Y_i$), change to this state taking place if a control signal (a) is applied to said binary memory unit (BC) from an input decoder (ED) associated with the input lines form an output decoder (OD) associated with the output lines.

16. A method for testing connections between a fist group of line ($D_i$, $C_j$) and a second group of liens ($Y_j$) by means of check words, comprising the steps of:
continuously deriving from signals on the lines ($D_i$, $C_j$) of the first group on a parallel basis, a first check word (PB1) in accordance with a set of rules, said fist check word (PB1) consisting of a number which indicates how many lines of the first group are a carrying a given signal simultaneously;
deriving from signals on the lines ($Y_j$) of the second group on a parallel basis a second check word (PB2) in accordance with the set of rules, said second check word (PB2) consisting of a number which indicate how many lines of the second group are carrying a given signal simultaneously; and
comparing the two check words and providing an error indication when the check words disagree.

17. A method as claimed in claim 16, characterized in that the first check word (PB1) is a parity bit which indicates whether an even or odd number of input lines ($D_i$, $C_j$) is carrying a given signal, and that the second check word (PB2) is a parity bit which indicates whether an even or odd number of output lines ($Y_i$) is carrying a given signal.

18. A method as claimed in claim 17, characterized in that the devices (P, PG, PC, PCB, ODP, SP) for the derivation of check words are formed by means of exclusive-OR-gates.

* * * * *

UNITED STATES PATENT AND TRADEMARK OFFICE
CERTIFICATE OF CORRECTION

PATENT NO. : 5,134,618
DATED : July 28, 1992
INVENTOR(S) : H. Matt et al

It is certified that error appears in the above-identified patent and that said Letters Patent is hereby corrected as shown below:

At column 7, line 27, please change "spec" to --space--;
    at line 45, please change "al" to --all--; and
    at line 67, please delete "," after "(BC)" and insert --,-- after "column".

At column 8, line 51, please change "connection s" to --connections--.

At column 9, line 7, please change "them emory" to --the memory--; and
    At line 8, please change "$c_j$" to --$C_j$--.

At column 10, line 7, please change "liens" to --lines--;
    at line 12, please change "fist" to --first--; and
    at line 19, please change "indicate" to --indicates--.

Signed and Sealed this

Twenty-fourth Day of August, 1993

Attest:

BRUCE LEHMAN

*Attesting Officer*    *Commissioner of Patents and Trademarks*